US007616265B2

(12) United States Patent
Kuznetsov et al.

(10) Patent No.: US 7,616,265 B2
(45) **Date of Patent: *Nov. 10, 2009**

(54) METHOD AND SYSTEM FOR ENABLING DETECTION OF SIGNALS IN THE PRESENCE OF NOISE

(75) Inventors: Sergei Kuznetsov, Voorhees, NJ (US); Whitney Blackmon, Holland, PA (US)

(73) Assignee: Cox Communications, Inc., Atlanta, GA (US)

( * ) Notice: Subject to any disclaimer, the term of this patent is extended or adjusted under 35 U.S.C. 154(b) by 12 days.

This patent is subject to a terminal disclaimer.

(21) Appl. No.: 11/742,293

(22) Filed: Apr. 30, 2007

(65) Prior Publication Data

US 2007/0201578 A1 Aug. 30, 2007

Related U.S. Application Data

(63) Continuation of application No. 10/306,360, filed on Nov. 27, 2002, now Pat. No. 7,212,252.

(51) Int. Cl.
*H04N 5/44* (2006.01)

(52) U.S. Cl. ................................ 348/734; 340/825.72

(58) Field of Classification Search ................. 348/734; 340/825.72, 825.75, 825.73; 455/500
See application file for complete search history.

(56) References Cited

U.S. PATENT DOCUMENTS

| | | | | |
|---|---|---|---|---|
| 4,809,257 | A | 2/1989 | Gantenbein et al. | |
| 4,866,434 | A | 9/1989 | Keenan | |
| 4,897,718 | A | 1/1990 | Testin et al. | |
| 6,424,285 | B1 | 7/2002 | Perdue et al. | |
| 6,895,252 | B2 | 5/2005 | Pugel | |
| 7,042,366 | B1 | 5/2006 | Mui et al. | |
| 7,212,252 | B2 * | 5/2007 | Kuznetsov et al. | 348/731 |

FOREIGN PATENT DOCUMENTS

| | | | | |
|---|---|---|---|---|
| JP | 09051593 | A | * | 2/1997 |
| JP | 09083272 | A | * | 3/1997 |
| JP | 2002106928 | A | * | 4/2002 |

* cited by examiner

*Primary Examiner*—M. Lee
(74) *Attorney, Agent, or Firm*—Merchant & Gould

(57) ABSTRACT

A method for transmitting data to a receiver comprises the steps of transmitting a pre-conditioning signal to the receiver, and beginning to transmit at least one data packet to the receiver within a given period after beginning transmission of the pre-conditioning signal. The preconditioning signal is separate from a leader of the data packet to be transmitted.

12 Claims, 4 Drawing Sheets

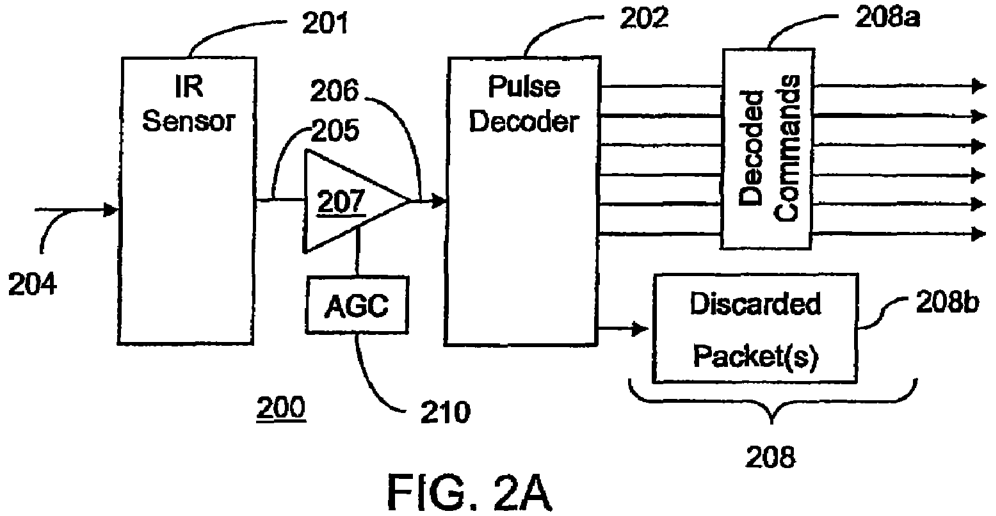
FIG. 2A
FIG. 2B
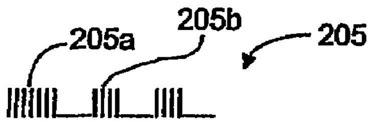
FIG. 2C
FIG. 2D
FIG. 2E
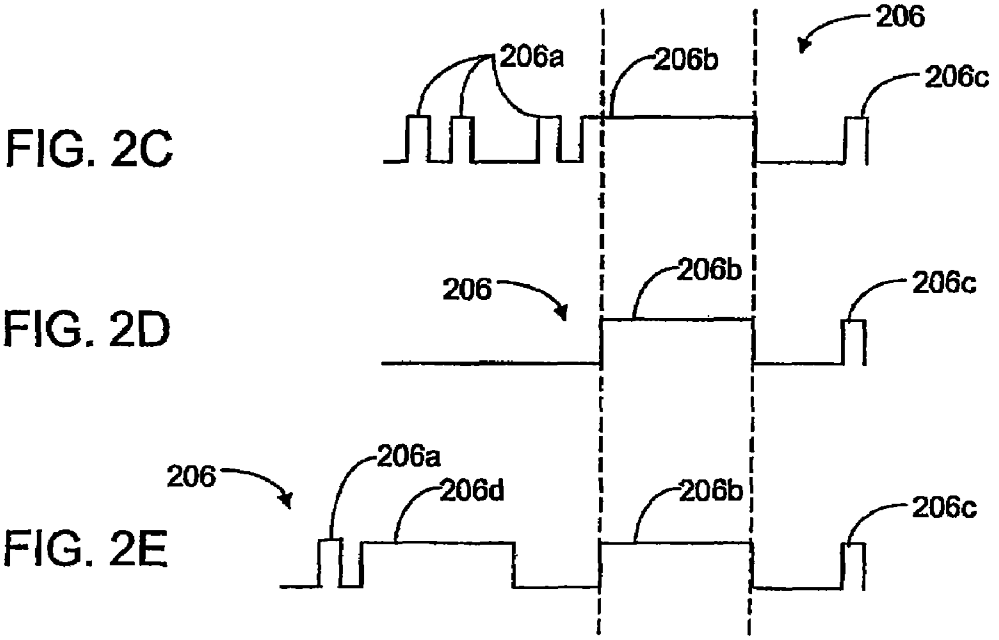

METHOD AND SYSTEM FOR ENABLING DETECTION OF SIGNALS IN THE PRESENCE OF NOISE

CROSS REFERENCE TO RELATED APPLICATIONS

This application is a continuation of commonly owned U.S. patent application Ser. No. 10/306,360, filed Nov. 27, 2002 now U.S. Pat. No. 7,212,252, entitled METHOD AND SYSTEM FOR ENABLING DETECTION OF SIGNALS IN THE PRESENCE OF NOISE, which application is incorporated by reference herein as if set forth in its entirety.

FIELD OF THE INVENTION

The present invention relates to wireless signal and reception transmission generally.

BACKGROUND

The use of infrared radiation (IR) communications for the transmission of audio, video, data and control signals is rapidly growing. Applications using infrared transmission include remote controls for television, cable set top boxes, videocassette recorders (VCRs), digital versatile disk (DVD) players, compact disk changers and the like, remote keyboards, wireless LAN networks, video-conferencing equipment, computer peripherals, medical equipment, and personnel and equipment locating monitors.

In IR communications, commands and keystrokes are conveyed serially in IR packets via an IR transmission channel. The transmitted packet(s) include modulated data pulses preceded by a leader. The leader is much wider than a data pulse. The leader marks the beginning of the packet, and initiates a gain adjustment by an automatic gain control (AGC) circuit in the corresponding IR Receiver, for optimum data detection and subsequent decoding.

Before the rapid growth in functionality of IR remote control devices, a remote control had relatively few keys, and performance of the IR channel was not an issue. The user performed simple operations, such as: switch channel, adjust audio volume, toggle mute switch, and the like. These manual key operations were relatively slow. During a key press, a remote control device typically entered an autorepeat mode and emitted several copies of the same IR packet in a row, usually separated by an autorepeat interval. The repetition of IR Packets raised the IR channel reliability. Excess autorepeated packets were discarded by the receiving device.

The appearance of more complex audio-video systems and interactive television (ITV)—in which the user utilizes an IR wireless keyboard—caused rapid saturation of the IR control channel. To meet performance requirements, typed keystrokes are now buffered in the transmitting device and are transmitted as a series of distinct IR Packets. Complex remote controls and keyboard with a multitude of keys, and pointing devices (e.g.: mouse) encode some keystrokes as a single IR packet and encode other keystrokes as a combination of several distinct IR Packets.

Such complex systems have been observed to suffer the problem of data loss in the same lighting conditions where simpler devices or functions still function as before. The proliferation of fluorescent lamps as a cost effective source of ambient light further degrades the reliability of the IR communication channel.

Loss of data in the IR communication channel causes the user to repeat operations (commands, keystrokes), or choose to sit in a less desirable position much closer to the IR receiver. Errors during keyboard typing often cause marker (cursor) repositioning and necessitate retyping of lost letters on the screen. This considerably slows down typing in comparison to a (wired) computer keyboard input, drastically diminishing customer satisfaction. Some important operations are rendered difficult or impossible, e.g.: secure password entry.

An apparatus and method for increasing reliability without taxing performance of IR channel is desired.

SUMMARY OF THE INVENTION

A method for transmitting data to a receiver comprises the steps of transmitting a pre-conditioning signal to the receiver, and beginning to transmit at least one data packet to the receiver within a given period after beginning transmission of the pre-conditioning signal. The preconditioning signal is separate from a leader of the data packet to be transmitted.

BRIEF DESCRIPTION OF THE DRAWINGS

FIG. 2A is a block diagram of the receiver of FIG. 1.

FIG. 2B shows the raw pulse train output by the sensor.

FIG. 2C shows the amplified signal in the presence of noise.

FIG. 2D shows the amplified signal in the steady state.

FIG. 2E shows the amplified signal with a pre-conditioning signal added.

DETAILED DESCRIPTION

Various interference situations and noise sources, such as fluorescent lamps, can interfere with reliable operation of IR receiver systems. For example, set top boxes and televisions receiving signals from infrared keyboards, such as those of a type commonly employed in the interactive television industry, are known to occasionally fail to detect portions of data transmissions due to the inability of the receive circuits in the set top box, or television set, to distinguish transmitted data from noise.

The inventor has found that one cause of the problem of dropping first-transmitted packets is attributable to the way typical receiver automatic gain control (AGC) circuits operate in the absence of infrared command signals, i.e., received data packets. Following the end of a data transmission session data signals cease to be detected by the receiver. As a result, receiver AGC circuits typically begin to increase the gain of their associated amplifiers in order to increase the likelihood of detecting weak, or distant signals. As a result of this increased gain, the probability of the receive circuits responding to noise as if it were a signal (or responding to a data signal as though it were noise) increases. When the gain is very high, the amplifier becomes saturated with ambient noise (i.e., tuned to the level of the noise). Should an actual data transmission begin while the receiver is in this (high gain) state, this increases the likelihood that the control signal is intertwined with noise, which confuses the pulse decoder, and the receiver fails to detect the first packet of actual data. After at least one leader signal is received, the receiver circuits adjust the AGC gain in response to the (stronger-than-noise) leader signal and the receiver is ready for proper operation.

Figure 1:
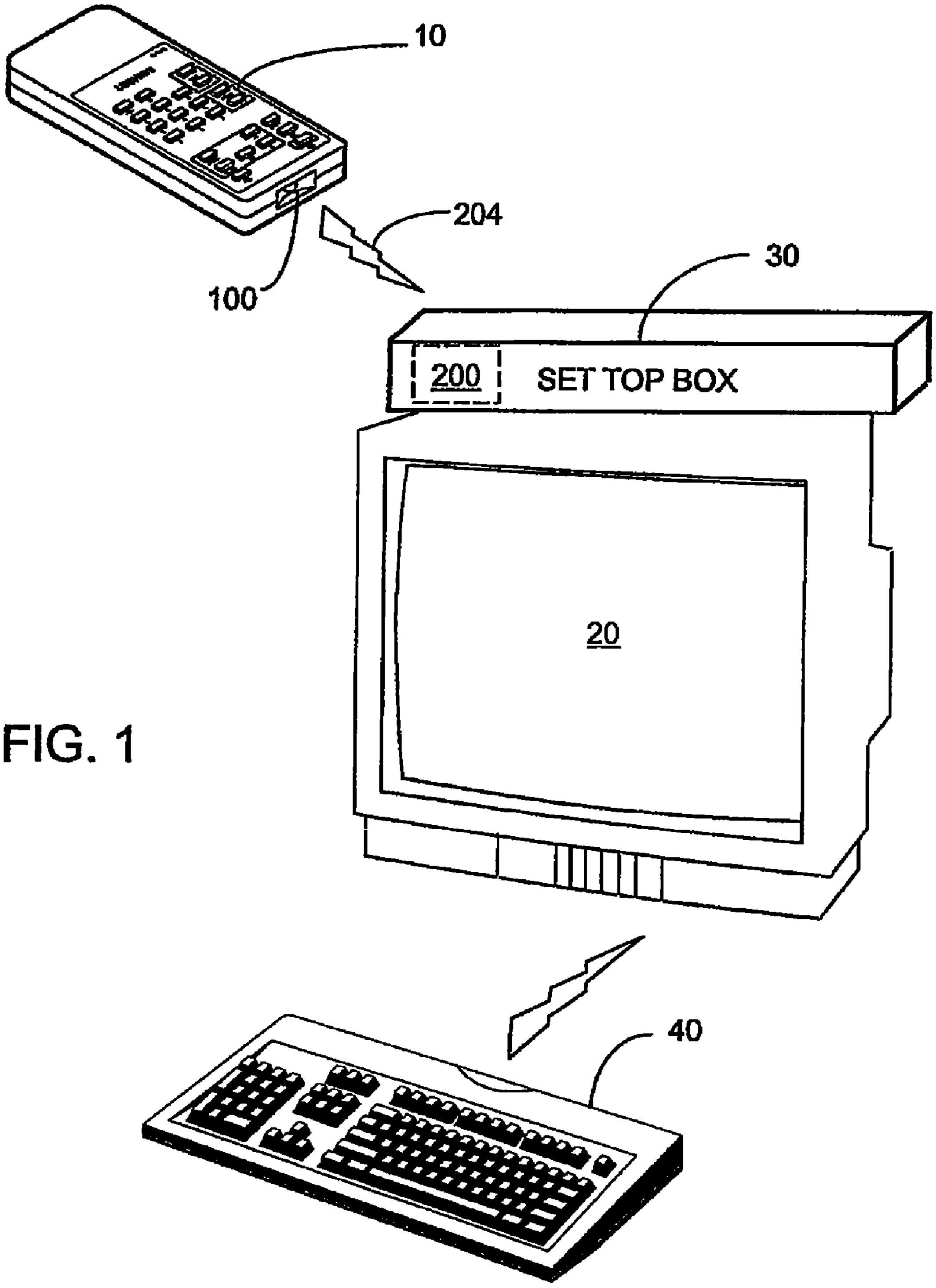
FIG. 1 shows a system in which a pre-conditioning signal is sent.

FIG. 1 is a diagram showing one embodiment of a system in which a transmitter 100 transmits signals to a receiver 200. In some embodiments, the transmitter 100 is included in a wireless infrared (IR) remote control device 10. In other embodiments, the transmitter 100 is included in a wireless infrared (IR) keyboard 40. In further embodiments, the transmitter 100 is included in devices having a variety of controls, such as a mouse (not shown), a pressure sensitive pad, and an array or touch-sensitive sensors. In some embodiments, the receiver 200 is an infrared receiver included in a set top box 30, which is connectible to a television 20. In other embodiments, the receiver 200 is included within the television 20 itself. In other embodiments (not shown), receivers 200 are included in devices such as a videocassette recorders (VCRs), digital versatile disk (DVD) players, compact disk changers, wireless local area networks (LANs), video-conferencing equipment, computer peripherals, medical equipment, personnel and equipment locating monitors, and the like. These are only examples, and do not limit the type of device in which the receiver 200 is included.

In the description of the examples below, reference is made to a transmitter 100 in a remote control device 10 and a receiver 200 in a set top box 30. It will be understood that the description below applies equally to all of the transmitter embodiments and all of the receiver embodiments. Similarly, reference is made to a key press on the remote control device 10. It will be understood that the description below applies equally to actuation of the control(s) on any other type of input device (e.g., mouse, touch sensitive pad, and the like) having a transmitter 100.

FIG. 2A shows an embodiment of the receiver 200. The receiver 200 has an IR sensor 201 coupled to an amplifier 207. The sensor 201 receives a train of IR pulses 204 from the transmitter 100, and outputs an electrical signal train 205, such as the pulse train shown in FIG. 2B. The pulse train 205 includes a leader 205*a* and data 205*b*. The receiver 200 has a standard AGC circuit 210 for controlling the gain of amplifier 207 applied to the input signal 205. The amplifier 207 outputs a demodulated signal envelope 206 to a pulse decoder 202. The pulse decoder 202 decodes the stream into commands and data 208. Other conventional receiver components (e.g., filter, integrator, Schmitt Trigger) are omitted from this description for brevity, but are understood by those of ordinary skill in the art to be included in the receiver.

The data 205*b* include two portions: payload data and a control field. The payload data include at least one of the group comprising key strokes and commands. The control field allows the recipient to confirm that the received payload data are not corrupted. In some embodiments the control field includes an inverted copy of the payload data. In other embodiments, the control field includes a checksum. In other embodiments, the control field includes a cyclical redundancy code (CRC).

FIGS. 2C and 2D show the processing of an incoming signal train 205. In FIG. 2C, after some time has passed in the absence of IR packets, the AGC circuit 210 increases the sensitivity of the sensor 201 (i.e., increases the gain applied by amplifier 207). If a relatively long period has passed since the last packet, the gain is so high that the amplifier 207 becomes saturated with ambient noise (i.e., tuned to the level of the noise). In the example of FIG. 2C, the amplitude of the noise 206*a* is as great as the amplitude of the signals 206*b* and 206*c*.

The IR sensor 201 needs to see the whole envelope of the leader signal 205*a* to start data decoding. Generally, noise 206*a* only affects detection of the first packet. The single leader signal is sufficient to set the AGC 210 by design. However, in the noise environment during the long pause between keystrokes, the AGC 210 is in the state shown in FIG. 2C; the output of the amplifier of IR Sensor 201 leaks noise (false signals). The Leader 206*b* of the IR Packet sets the AGC 210 properly, but the leading front of the Leader signal 206*b* is buried in that noise 206*a*, masking the Leader signal 206*b*. Subsequent data signals 206*c* from the first data packet are relatively short and are similar to the leaking noise pulses 206*a*.

As shown in FIG. 2D, the second data packet, and subsequent packets following each other in short intervals, are free from leaking noise 206*a*, and the output 206 of the IR sensor 201 and amplifier 207 is stable. The second and subsequent Leader signals 206*b* exhibit both fronts on the output of the IR Sensor 201, and trigger the data decoding mechanism of Pulse Decoder 202. So long as a packet was recently received (during a period of time below the time it takes the AGC 210 to increase its sensitivity to the noise level), then the leader 206*b* and the data 206*c* are clearly distinguishable as shown in FIG. 2D.

FIG. 2E shows a signal train 206 in which a pre-conditioning signal 206*d* is transmitted before the leader 206*b* of the first data packet. In the exemplary embodiment, the pre-conditioning signal 206*d* has the format of the leader 206*b*, namely a long pulse. The pre-conditioning signal 206*d* has no data field, so the receiver 200 handles the pre-conditioning signal like an invalid packet which is discarded, at block 208*b*. Subsequent valid packets 208*a* are decoded and passed to the recipient application. This approach is advantageous, because it does not require a change in the receiver 200.

In other embodiments, the pre-conditioning signal is a full packet which, by design, is not processed by the application in the device having the receiver 200. For example, in some embodiments, the pre-conditioning signal has valid payload data, but a control field that indicates the payload data is invalid. For example, in one exemplary system in which the control field includes an inverted copy of the payload data, the pre-conditioning signal includes a control field which is not an inverted copy of the payload data. In other embodiments, where the control field includes a checksum, the control field of the pre-conditioning signal includes a bad checksum. Inclusion of control field indicating invalid payload data causes the recipient to handle the packet as though the packet is corrupted, and discards the packet 208*b*. This approach also does not require any change in the receiver.

In other embodiments, the pre-conditioning signal includes a syntactically correct dummy packet, which has control field indicating that the payload data are correctly transmitted; in this case, however, the payload data correspond to a "null command" that the recipient recognizes as not requiring any action to be taken by the recipient. By processing the dummy packet, the AGC 210 is automatically adjusted. In these embodiments, the receiver recognizes a null command, which requires modification to some receivers.

In still other embodiments, the pre-conditioning signal includes a control field indicating that the payload data are correctly transmitted, and the pre-conditioning signal appears to be a good packet at all layers of the protocol stack except the uppermost (application) layer. In this example, the payload data are considered invalid by an application program that receives the data. In these embodiments, the application program receiving the data has an application level mechanism for processing invalid commands and data.

Other embodiments include pre-conditioning signals which differ from the leader of the data packet that follows the pre-conditioning signal.

Figure 3:
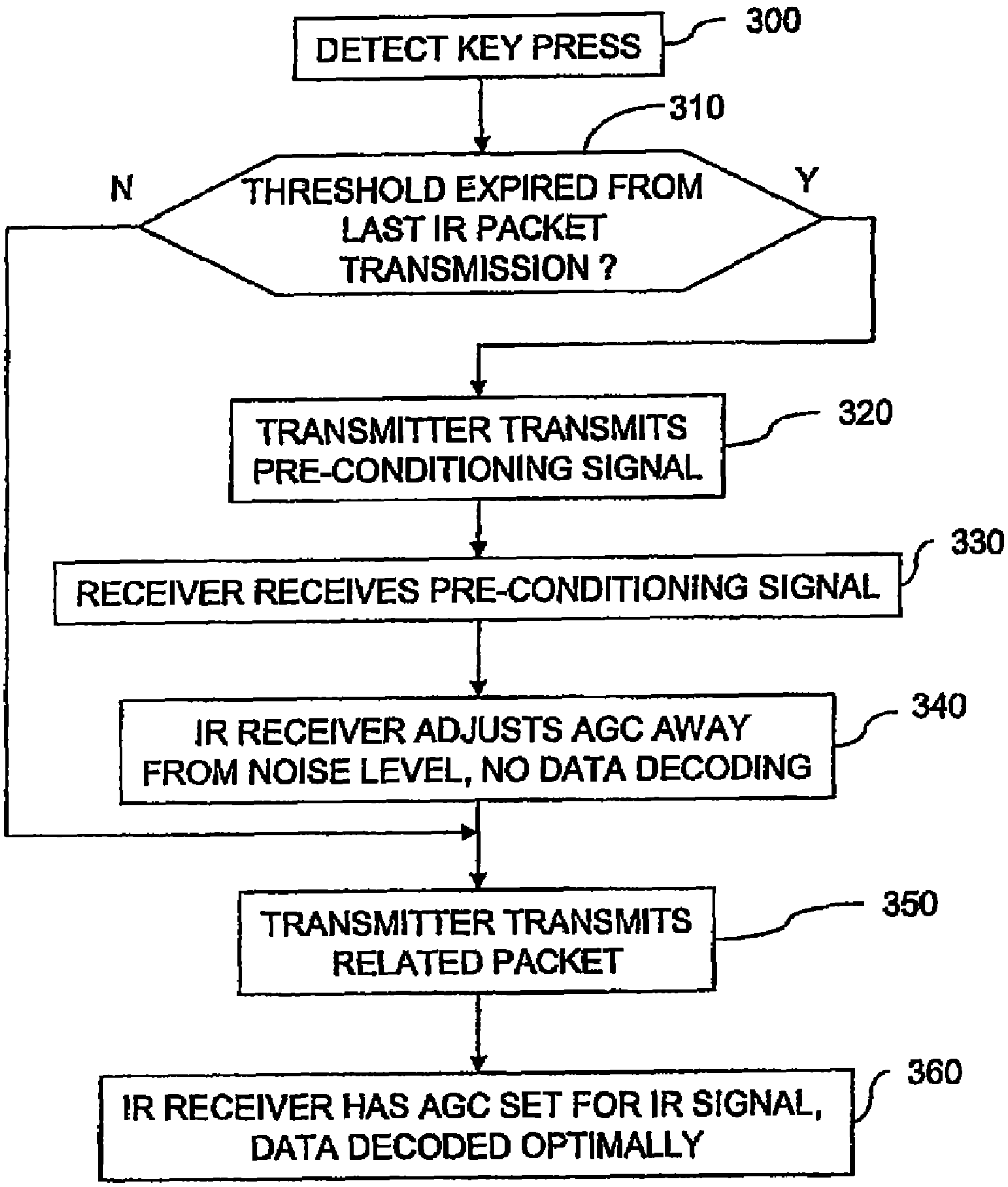
FIG. 3 is a diagram of an exemplary embodiment of a system in accordance with the invention.

FIG. 3 shows an exemplary system in which a pre-conditioning signal 206*d* is sent before initiating transmission of a data packet. In block 300, a key press is detected within the remote control device 10 having the transmitter 100 and a plurality of keys.

In block 310, an amount of time since the last key press is compared to a threshold value, and a determination is made whether the amount of time since the last key press exceeds the threshold. If the threshold time has not passed, then block 350 is next. Otherwise, block 320 is next.

In some embodiments, the threshold time is set at the factory in which the device 10 having the transmitter 100 is manufactured. For transmitting to any given receiver in a given lighting condition (noise environment), an appropriate threshold is readily determined experimentally in the factory by varying the delay between key presses (data packets) and noting the length of the delay at which the ability of the receiver to properly decode the first packet (after the delay) begins to degrade. The threshold is set slightly below the delay value at which degradation begins. To select a single delay that produces acceptable results when applied across a set of different lighting conditions, the minimum delay corresponding to any of the set of lighting conditions is selected.

In other embodiments, in which the algorithm used by the AGC 210 are known to the manufacturer of the device 10 having the transmitter 100, a target ambient light level is selected, and the threshold value is set to an amount of time slightly shorter than the delay at which the AGC will boost the gain of amplifier 207 to a level at which the amplitude of noise is as great as the amplitude of data.

In further embodiments, the device 10 having the transmitter 100 includes a control (not shown) that allows a user to manually adjust the threshold time in situ until a satisfactory result is achieved.

At block 320, the transmitter 100 transmits the pre-conditioning signal 206*d*. The pre-conditioning signal 206*d* has sufficient duration to cause a sensitivity adjustment in an automatic gain control of the receiver. In some embodiments, the pre-conditioning signal 206*d* has the same duration as the leader 206*b* that accompanies a regular data packet. The pre-conditioning signal, however, does not require any payload data. The pre-conditioning signal 206*d* is separate from the leader 206*b* of the data packet 206*c*. In other embodiments, the pre-conditioning signal 206*d* has other formats different from that of the leader 206*b*.

At block 330, the receiver 200 receives the pre-conditioning signal.

At block 340, the receiver 200 adjusts the AGC 210 away from the noise level, to a normal sensitivity level. During this period, no data decoding occurs. Because the pulse decoder 202 is designed to read the data 206*c* that follows the leader 206*b*, but does not interpret the leader as data, the pulse decoder handles the pre-conditioning signal in the same way that the pulse decoder handles a corrupt packet.

At block 350, after a fixed delay, but within a given period after beginning transmission of the pre-conditioning signal 206*d*, the transmitter 100 transmits the related packet 206*c*, which has a normal packet leader 206*b*.

In some embodiments, the delay between the pre-conditioning signal 206*d* and the leader 206*b* of the first succeeding packet is set at the factory in which the device 10 having the receiver is manufactured. In some embodiments, the amount of time between beginning of the pre-conditioning signal 206*d* and the beginning of the leader 206*b* of the first succeeding data packet is set at the period between packets transmitted from the transmitter during a multi-packet transmission. For example, in conventional IR keyboards, a 100 millisecond delay is automatically inserted between packets for multi-packet transmissions to conventional Motorola and Scientific Atlanta set top boxes. Therefore, in some embodiments, the delay between the beginning of the pre-conditioning signal 206*d* and the beginning of the leader 206*b* of the next data packet is set at 100 milliseconds.

Other embodiments use longer or shorter delays between the beginning of the pre-conditioning signal 206*d* and the beginning of the leader 206*b* of the first succeeding packet. Use of a substantially longer time taxes the data channel, because no data packets are transmitted between the beginning of the pre-conditioning signal 206*d* and the leader 206*b* of the next data packet. If the delay between the pre-conditioning signal and the next data packet is too short, however, then the pulse decoder does not decode the next regular IR packet properly.

In some embodiments, the manufacturer determines an appropriate delay between the pre-conditioning signal 206*d* and the beginning of the leader 206*b* of the next packet for a given receiver by beginning with a short delay and varying the delay until the receiver 200 is consistently distinguishing noise from the first data packet (in a target lighting environment) after a long period in which no packets are sent. In other embodiments, the delay is initially set to the inter-packet delay (e.g., 100 milliseconds), and this delay is used if the receiver 200 is consistently distinguishing noise from the first data packet after a long period in which no packets are sent.

In further embodiments, the device 10 having the transmitter 100 includes a control (not shown) for varying the delay between the pre-conditioning signal 206*d* and the leader 206*d* of the first succeeding packet. The user adjusts the delay in situ until a satisfactory response is achieved.

At block 360, the IR receiver has its AGC 210 set for the IR signal, at the normal sensitivity level. The data in the packet 206*c* are decoded optimally.

In the example described above, the actions of the transmitter 100 and receiver 200 are asynchronous and form an open loop system. The transmitter 100 has a pre-configured threshold time, determined in a manner such as that described above. The transmitter 100 does not send the pre-conditioning signal 206*d* if the delay between successive packets is less than the threshold; the transmitter sends the pre-conditioning signal 206*d* when the delay is at least as great as the threshold. The transmitter 100 does not require any actual real-time information regarding the state of the receiver 200. The transmitter 100 does not require any feedback from the receiver 200. Thus, an exemplary system is formed by implementing the pre-conditioning signal in the device 10 having the transmitter 100, without making any modifications to the receiver 200.

Figure 4:
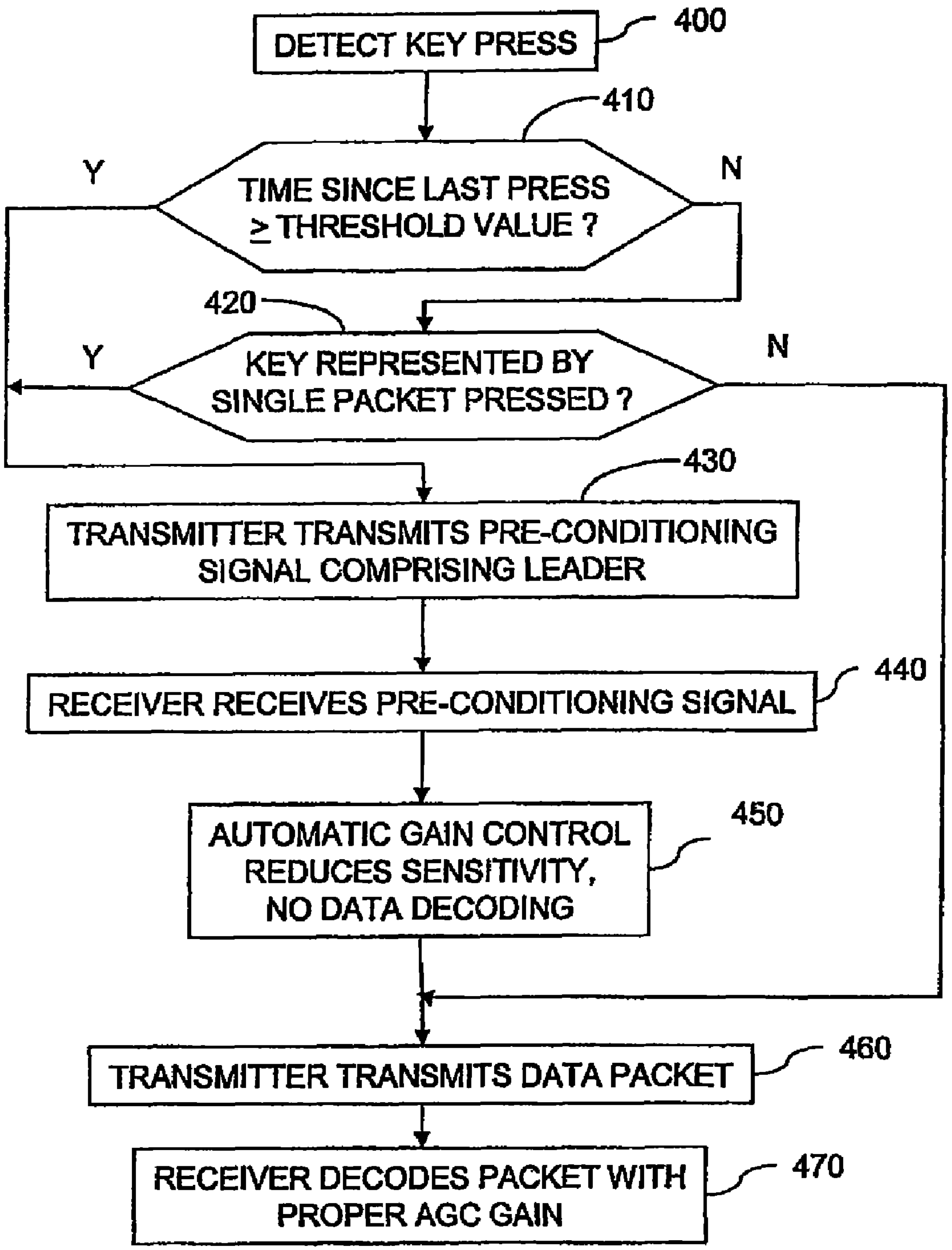
FIG. 4 is a diagram of another exemplary embodiment of a system in accordance with the invention.

FIG. 4 shows another system using the pre-conditioning signal 206*d*. The system of FIG. 4 is advantageous when the protocol between the transmitter and the receiver includes a feature wherein the pressing of at least one key is represented by a single packet of data. In some protocols, some keys are represented by a plurality of packets, and other keys are represented by a single packet. For a key press represented by a single packet, the likelihood is increased that the key press will be missed by the receiver if the key represented by a single packet is the first packet after a delay, even if the delay is below the threshold. The system of FIG. 4 addresses this problem.

At block 400, a key press is detected in a device 10 having a transmitter 100.

At block 410, a determination is made whether the time since the last key press is at least the threshold value. The threshold value is determined using any of the techniques described above with reference to FIG. 3. If the threshold time has not passed, block 420 is next. Otherwise, if the threshold time has passed, block 430 is next.

At block 420, an additional determination is made whether a key represented by a single packet is pressed. If a key represented by a single packet is pressed, block 430 is next. Otherwise, block 460 is next.

At block 430, the transmitter 100 transmits the pre-conditioning signal 206*d,* including a leader.

At block 440, the receiver 200 receives the pre-conditioning signal.

At block 450, the AGC 210 reduces the sensitivity of the amplifier 207 of IR sensor 201. There is no data decoding for the pre-conditioning signal 206*d.*

At block 460, the transmitter 100 transmits the next data packet, including a leader 206*b* and data 206*c*.

At block 470, the receiver decodes the packet with the proper AGC gain.

In the embodiment of FIG. 4, the pre-conditioning signal (block 430) is sent every time a key represented by a single packet is pressed. In other embodiments, to avoid taxing the channel, block 420 determines whether both of the following conditions are met: (a) a key represented by a single packet is pressed, AND (b) a second threshold time (greater than zero and lower than the threshold of block 410) has passed since the last key press. This takes into account that the AGC does not boost the sensitivity of the sensor 201 to its highest level if a relatively short time has passed since the last key press.

The embodiment of FIG. 4 uses block 420 to provide a second criterion, which is used to decide whether to send the pre-conditioning signal 206*d,* in addition to the criterion of block 410. In other embodiments, the criterion of block 420 is used in place of the criterion of block 410, which is omitted. In further embodiments, other criteria are used to decide when to send the pre-conditioning signal 206*d.*

In further embodiments, the pre-conditioning signal is sent before each data packet. In one variation, the pre-conditioning signal is a leader, as described above. In another variation, the pre-conditioning signal is an extra copy of the data packet; in essence, this variation eliminates single packet commands and key presses. The option of sending the pre-conditioning signal before each packet is simpler to implement, but it taxes the IR communication more than the embodiments of FIGS. 3 and 4.

Although the invention has been described in terms of exemplary embodiments, it is not limited thereto. Rather, the appended claims should be construed broadly, to include other variants and embodiments of the invention, which may be made by those skilled in the art without departing from the scope and range of equivalents of the invention.

What is claimed is:

1. A method for transmitting at least one data packet toward a receiver, comprising:

transmitting toward the receiver a pre-conditioning packet adapted to avoid processing by an application being executed by a device including the receiver; and transmitting toward the receiver the first of the at least one data packet within a predefined time period after transmitting the pre-conditioning packet, wherein:

each of the at least one data packets comprises a control field and a payload data field, the control field including an inverted copy of data within the respective payload data field; and the pre-conditioning packet comprises a control field and a payload data field, the control field not including an inverted copy of data within its respective payload data field.

2. A method for transmitting at least one data packet toward a receiver, comprising:

transmitting toward the receiver a pre-conditioning packet adapted to avoid processing by an application being executed by a device including the receiver; and transmitting toward the receiver the first of the at least one data packet within a predefined time period after transmitting the pre-conditioning packet, wherein:

each of the at least one data packets comprises a control field and a payload data field, the control field including a checksum of data within the respective payload data field; and the pre-conditioning packet comprises a control field and a payload data field, the control field not including a checksum of data within its respective payload data field.

3. A method for transmitting at least one data packet toward a receiver, comprising:

transmitting toward the receiver a pre-conditioning packet adapted to avoid processing by an application being executed by a device including the receiver; and transmitting toward the receiver the first of the at least one data packet within a predefined time period after transmitting the pre-conditioning packet, wherein:

the pre-conditioning packet comprises a control field including an invalid payload data indicator.

4. A method for transmitting at least one data packet toward a receiver, comprising:

transmitting toward the receiver a pre-conditioning packet adapted to avoid processing by an application being executed by a device including the receiver;

transmitting toward the receiver the first of the at least one data packet within a predefined time period after transmitting the pre-conditioning packet, and transmitting each remaining data packet of the at least one data packet toward the receiver, wherein:

if a predetermined amount of time elapses between a transmission of one packet and a time for transmission of a next data packet, a pre-conditioning packet is transmitted before the next data packet is transmitted.

5. A method for transmitting at least one data packet toward a receiver, comprising:

transmitting toward the receiver a pre-conditioning packet adapted to avoid processing by an application being executed by a device including the receiver; and transmitting toward the receiver the first of the at least one data packet within a predefined time period after transmitting the pre-conditioning packet, wherein:

the steps of transmitting are performed by a transmitter having a plurality of controls; and the step of transmitting a pre-conditioning packet is performed in response to a detecting an actuation of one of the controls when an amount of time since a most recent previous actuation of one of the controls is at least a threshold value.

6. The method of claim 5, wherein the amount of time is approximately a period of the data packet.

7. A transmitter, comprising:

means for transmitting toward a receiver a pre-conditioning packet and a first data packet, the pre-conditioning packet adapted to avoid processing by an application being executed by a device including the receiver, the first data packet being transmitted toward the receiver within a predefined time period after the transmitting of the pre-conditioning packet, wherein the transmitter has a plurality of controls, and the transmitter transmits the pre-conditioning signal when:

one of the plurality of controls is actuated, and an amount of time since a most recent previous actuation of any of the controls is at least a threshold value.

8. The transmitter of claim 7, wherein:

the transmitter has a plurality of controls, actuation of at least one of the plurality of controls being represented by transmission of a single packet, and the pre-conditioning packet is transmitted when one of the controls represented by transmission of a single packet is actuated.

9. The transmitter of claim 7, wherein the transmitter is included within a system, the system further comprising:

an infrared receiver having an automatic gain control that adjusts a sensitivity of the receiver in response to receipt of the pre-conditioning packet;

the transmitter comprising an infrared transmitter.

10. The transmitter of claim 9, wherein the infrared receiver has a pulse decoder for processing the pre-conditioning packet as a corrupted data packet.

11. The transmitter of claim 7, wherein the transmitter is an infrared transmitter.

12. The transmitter of claim 7, wherein the receiver is an infrared receiver, and the transmitting of the pre-conditioning packet is of a duration sufficient to allow a sensitivity adjustment in an automatic gain control of the receiver.

* * * * *